(12) United States Patent
Weber

(10) Patent No.: US 7,484,785 B2
(45) Date of Patent: Feb. 3, 2009

(54) AUTOMATIC TUMBLE AND SLIDE VEHICLE SEAT ASSEMBLY

(75) Inventor: James Weber, West Bloomfield, MI (US)

(73) Assignee: Intier Automotive Inc., Newmarket, Ontario (CA)

( * ) Notice: Subject to any disclaimer, the term of this patent is extended or adjusted under 35 U.S.C. 154(b) by 250 days.

(21) Appl. No.: 10/559,218

(22) PCT Filed: Jun. 4, 2004

(86) PCT No.: PCT/US2004/018007

§ 371 (c)(1),
(2), (4) Date: Dec. 2, 2005

(87) PCT Pub. No.: WO2004/108470

PCT Pub. Date: Dec. 16, 2004

(65) Prior Publication Data

US 2006/0138795 A1    Jun. 29, 2006

(51) Int. Cl.
*B60N 2/12*  (2006.01)
*B60N 2/32*  (2006.01)

(52) U.S. Cl. .............. 296/65.05; 296/65.08; 296/65.11; 296/65.12; 297/15

(58) Field of Classification Search ............. 296/65.05, 296/65.08, 65.11–65.13; 297/331, 332, 334, 297/335, 15
See application file for complete search history.

(56) References Cited

U.S. PATENT DOCUMENTS 1,510,969 A   10/1924   Watrous
1,578,676 A   3/1926    Morgan (Continued)

FOREIGN PATENT DOCUMENTS

DE    298 10 333    11/1999

(Continued)

OTHER PUBLICATIONS

Supplemental European Search Report for PCT/US2004/018007 Dated Jul. 29, 2008.

*Primary Examiner*—Glenn Dayoan
*Assistant Examiner*—Gregory Blankenship
(74) *Attorney, Agent, or Firm*—Clark Hill PLC

(57) ABSTRACT

A riser assembly extends between a seat cushion and a floor of an automotive vehicle. The riser assembly includes a floor bracket that is fixedly secured to the floor. A rod extends laterally within the vehicle and is fixedly secured to the floor bracket. A front leg extends between upper and lower ends. The upper end is pivotally coupled to the seat cushion for movement of the seat cushion between a generally horizontal seating position and an upright position. The lower end is slidably coupled to the rod for lateral sliding movement of the seat cushion between primary and secondary positions. A pulley wheel is pivotally coupled to the front leg between the upper and lower ends. A cable includes an intermediate portion that extends between a first end fixedly secured to the seat cushion and a second end fixedly secured to the floor bracket. The intermediate portion is wrapped around the pulley wheel for effecting automatic lateral movement of the seat cushion between said primary and secondary positions in response to pivotal movement of the seat cushion between seating and upright positions, respectively. A biasing member extends between the front leg and the floor bracket for laterally biasing the seat cushion toward the primary position.

19 Claims, 10 Drawing Sheets

U.S. PATENT DOCUMENTS

| | | | |
|---|---|---|---|
| 1,592,465 A | 7/1926 | Morgan | |
| 5,593,208 A * | 1/1997 | Mitschelen et al. | 297/336 |
| 6,145,913 A | 11/2000 | Odagaki | |
| 6,286,886 B1 | 9/2001 | Odagaki | |
| 6,382,491 B1 * | 5/2002 | Hauser et al. | 296/65.05 |
| 6,435,590 B2 | 8/2002 | Miyahara et al. | |
| 6,578,919 B2 * | 6/2003 | Seibold et al. | 297/331 |
| 6,609,745 B2 | 8/2003 | Miyahara et al. | |
| 6,648,393 B1 * | 11/2003 | Milnar et al. | 296/65.11 |
| 6,669,261 B2 * | 12/2003 | Roberts et al. | 296/65.09 |
| 6,955,386 B2 * | 10/2005 | Rhodes et al. | 296/65.09 |
| 7,048,330 B2 * | 5/2006 | Daniel | 297/15 |
| 7,066,539 B2 * | 6/2006 | Hatta et al. | 297/344.14 |
| 7,121,609 B2 * | 10/2006 | Tame | 296/65.11 |
| 7,165,801 B2 * | 1/2007 | Tame et al. | 296/65.09 |
| 7,213,861 B2 * | 5/2007 | Yokoyama et al. | 296/65.09 |
| 7,213,881 B2 * | 5/2007 | Kim et al. | 297/336 |
| 7,252,319 B2 * | 8/2007 | Toyota et al. | 296/65.09 |
| 2002/0011737 A1 | 1/2002 | Miyahara et al. | |
| 2006/0175875 A1 * | 8/2006 | Syrowik et al. | 297/15 |
| 2006/0220411 A1 * | 10/2006 | Pathak et al. | 296/65.11 |

FOREIGN PATENT DOCUMENTS

| | | |
|---|---|---|
| FR | 2 704 494 | 11/1994 |
| FR | 2 845 046 | 4/2004 |
| WO | WO 00/21778 | 4/2000 |

* cited by examiner

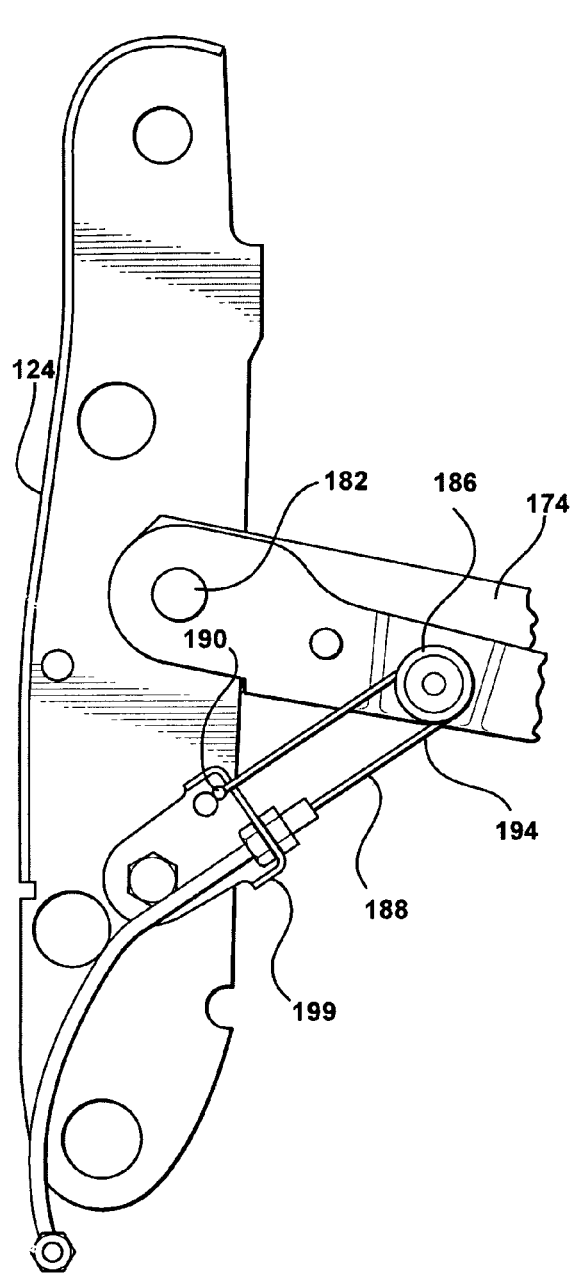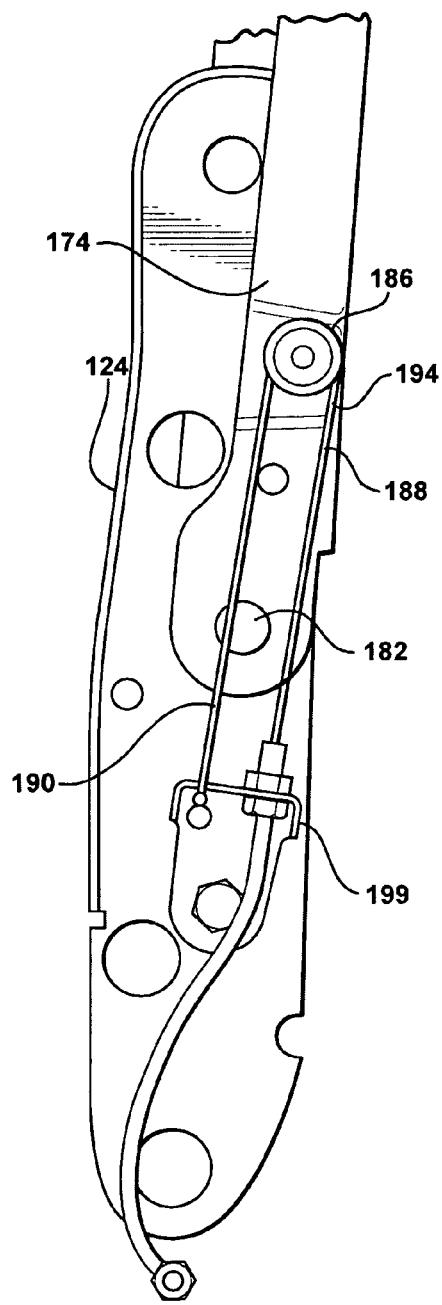
FIG - 10  FIG - 11

AUTOMATIC TUMBLE AND SLIDE VEHICLE SEAT ASSEMBLY

BACKGROUND OF THE INVENTION

1. Field of the Invention

The invention relates to a seat assembly for an automotive vehicle. More particularly, this invention relates to a riser assembly that allows the seat assembly to move laterally within the vehicle in response to pivotal movement of a seat cushion between seating and stowed positions.

2. Description of the Related Art

Automotive vehicles include seat assemblies for supporting occupants within the vehicle. Seat assemblies include a seat cushion and a seat back operatively coupled to the seat cushion by a recliner mechanism for allowing selective pivotal adjustment of the seat back relative to the seat cushion between a plurality of reclined seating positions. Typically, the seat back is also movable between any one of the reclined seating positions and a generally horizontal, forwardly stowed position to present a load floor surface on the back of It is known in the automotive seating art to mount a riser assembly having a four bar linkage between the seat cushion and the floor of the vehicle for moving the seat assembly between a seating position with the seat cushion spaced above the floor of the vehicle and a forwardly stowed position with the seat cushion disposed generally forward of the seating position and lying against the floor of the vehicle. It is also known for such a riser assembly to allow movement of the seat assembly between the seating position and a stowed position within a recess in the floor of the vehicle. However, it remains desirable to have a riser assembly that allows movement of the seat assembly between the seating position and a stowed position that is laterally offset from the seating position.

SUMMARY OF THE INVENTION

According to one aspect of the invention, a riser assembly extends between a seat cushion and a floor of an automotive vehicle. The riser assembly includes a floor bracket that is fixedly secured to the floor. A rod is fixedly secured to the floor bracket. A front leg extends between an upper end pivotally coupled to the seat cushion for movement of the seat cushion relative to the front leg between a seating position and an upright position and a lower end slidably coupled to the rod for lateral movement of the seat cushion between primary and secondary positions. A pulley wheel is pivotally coupled to the front leg between the upper and lower ends thereof. A cable includes an intermediate portion that extends between a first end fixedly secured to the seat cushion and a second end fixedly secured to the floor bracket, wherein the intermediate portion is wrapped around the pulley for effecting automatic lateral movement of the seat cushion between the primary and secondary positions in response to pivotal movement of the seat cushion between the seating and upright positions, respectively.

BRIEF DESCRIPTION OF THE DRAWINGS

Advantages of the present invention will be readily appreciated as the same becomes better understood by reference to the following detailed description when considered in connection with the accompanying drawings wherein:

FIG. 10 is an enlarged side view of a front portion of the riser assembly according to the second embodiment when the seat cushion is in the seating position;

FIG. 11 is an enlarged side view of the front portion of the riser assembly according to the second embodiment when the seat cushion is in the upright position.

DETAILED DESCRIPTION OF THE PREFERRED EMBODIMENT

Figure 1:
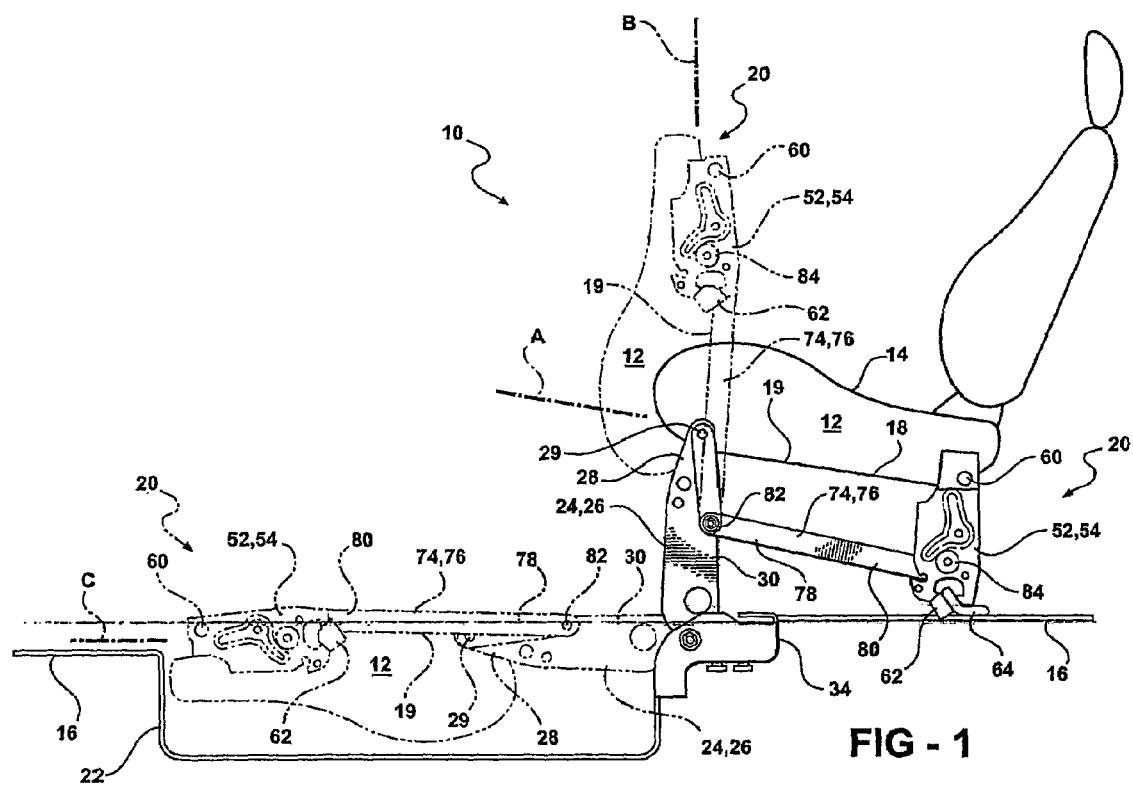
FIG. 1 is a side view of a seat cushion and a riser assembly according to the invention.

Referring to FIG. 1, a seat assembly for an automotive vehicle is generally indicated at 10. The seat assembly 10 includes a seat cushion 12 extending between an upper surface 14 for supporting an occupant above a floor 16 in the vehicle and an opposite bottom surface 18. A riser assembly 20 extends between the bottom surface 18 of the seat cushion 12 and the floor 16 of the vehicle. A track mechanism 19, as commonly known to those skilled in the art, is coupled between the bottom surface 18 and the riser assembly 20 for allowing selective forward and rearward adjustment of the seat cushion 12 relative to the riser assembly 20. The riser assembly 20 allows selective pivotal adjustment of the seat cushion 12 between a generally horizontal seating position A, a generally upright position B and a forwardly stowed position C disposed within a recess 22 formed in the floor 16. The riser assembly 20 also automatically laterally displaces the seat assembly 10 in response to the pivotal movement of the seat cushion 12 between the seating position and the forwardly stowed position.

Referring to FIGS. 2 through 8, the riser assembly 20 includes first 24 and second 26 front legs. The first 24 and second 26 front legs are generally parallel to each other and spaced apart. Each of the first 24 and second 26 front legs extends between an upper end 28 and a lower end 30. Each of the upper ends 28 of the first 24 and second 26 front legs is pivotally coupled to a front portion of the track mechanism 19 by a pivot pin 29 for movement of the seat cushion 12 relative to the riser assembly 20 between seating and upright positions. Alternatively, the upper end 28 of the first 24 and second 26 front legs may be pivotally coupled to the seat cushion 12 where the seat assembly 10 does not include track mechanism 19.

Figure 4:
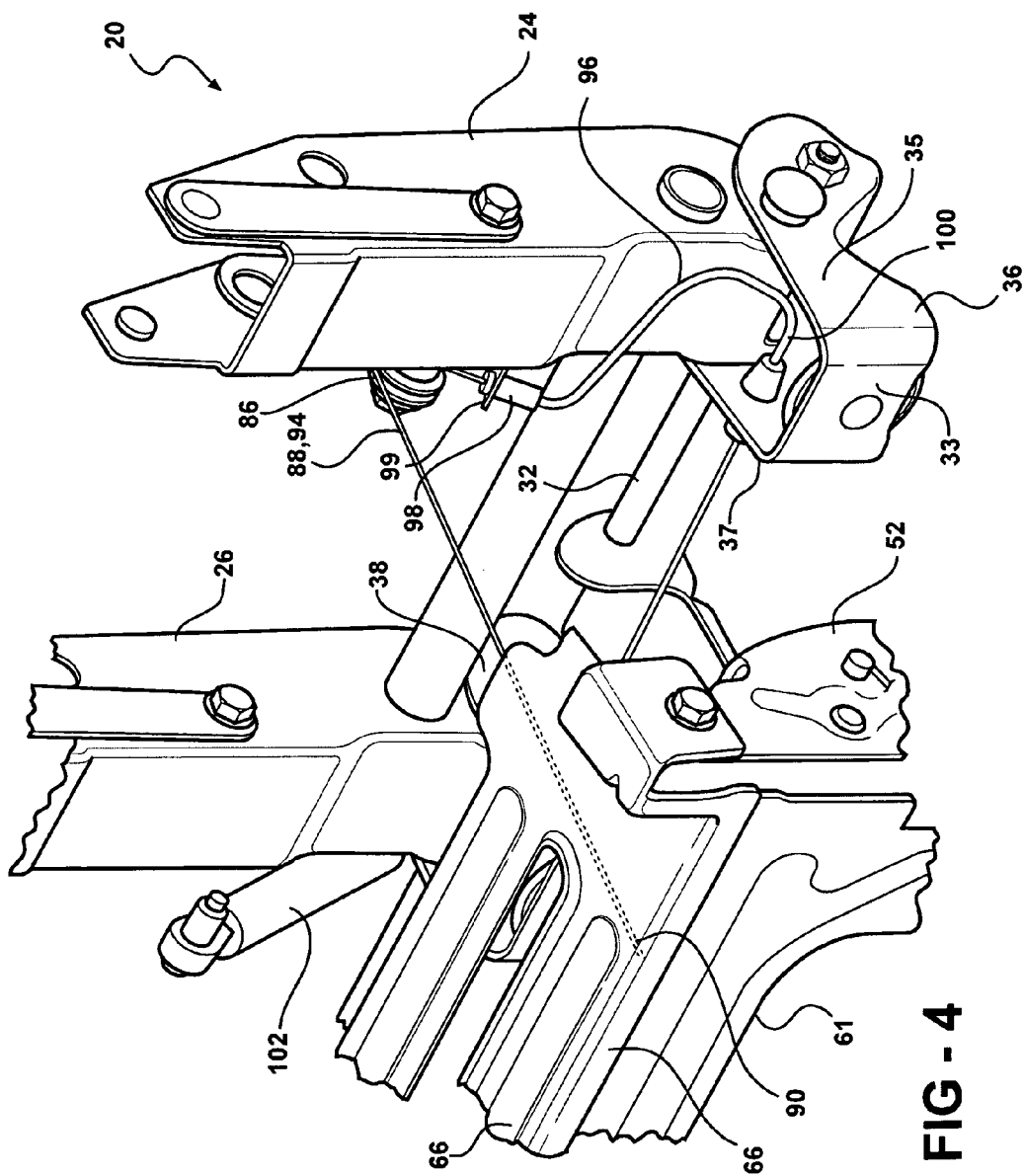
FIG. 4 is a partial rear perspective view of the riser assembly in the seating position.

The lower ends 30 are pivotally coupled to a rod 32 that is fixedly secured to the floor 16 of the vehicle by a floor bracket 34 for moving the seat cushion 12 between the upright and forwardly stowed positions. The lower ends 30 are also slidably coupled to the rod 32 for lateral movement of the riser assembly 20 between a primary position, shown in FIG. 2, and a secondary position laterally displaced from the primary position, shown in FIG. 7. First 36 and second 38 sliding brackets corresponding to the first 24 and second 26 front legs are slidably coupled to the rod 32. More specifically, each of the first 36 and second 38 sliding brackets has a generally U-shaped cross section defined by a base wall 33 extending between upright retaining walls 35, 37 as shown in FIG. 4. The first front leg 24 is laterally retained between the retaining walls 35, 37 of the first sliding bracket 36. The second front leg 26 is laterally retained between the retaining walls 35, 37 of the second sliding bracket 38. The first 36 and second 38 sliding brackets move laterally with the first 24 and second 26 front legs between the primary and secondary positions. A first biasing spring 39 laterally biases the riser assembly 20 toward the primary position.

Figure 5:
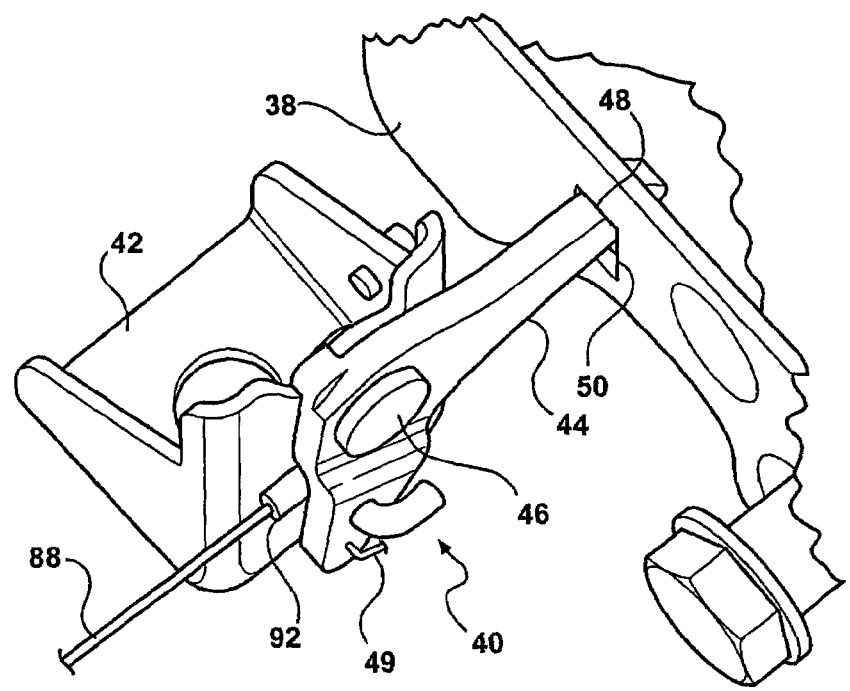
FIG. 5 is an enlarged perspective view of a latch mechanism for locking the riser assembly in a primary position.
Figure 6:
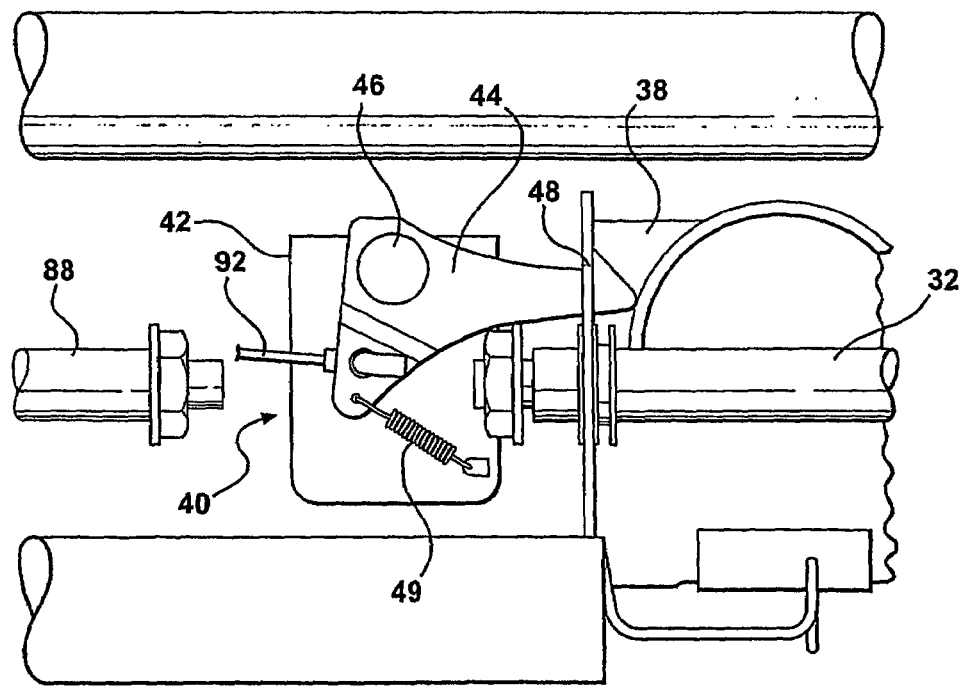
FIG. 6 is a top view of the latch mechanism.

Referring to FIGS. 5 and 6, the riser assembly 20 includes a latch mechanism 40. The latch mechanism 40 includes a latch bracket 42 that is fixedly secured to the floor bracket 34. A latch hook 44 is pivotally coupled to the latch bracket 42 by a pivot pin 46. A latch edge 48 is formed in the second sliding bracket 38. More specifically, the latch edge 48 defines an aperture 50 formed in the second sliding bracket 38. When the riser assembly 20 is in the primary position, the latch hook 44 projects through the aperture 50 and hookingly engages the latch edge 48. While engaged with the latch edge 48, the latch hook 44 retains the riser assembly 20 in the primary position. The latch hook 44 is movable in and out of locking engagement with the latch edge 48. A latch spring 49 biases the latch hook 44 in a counterclockwise direction, as viewed in FIG. 6, toward engagement with the latch edge 48.

Figure 2:
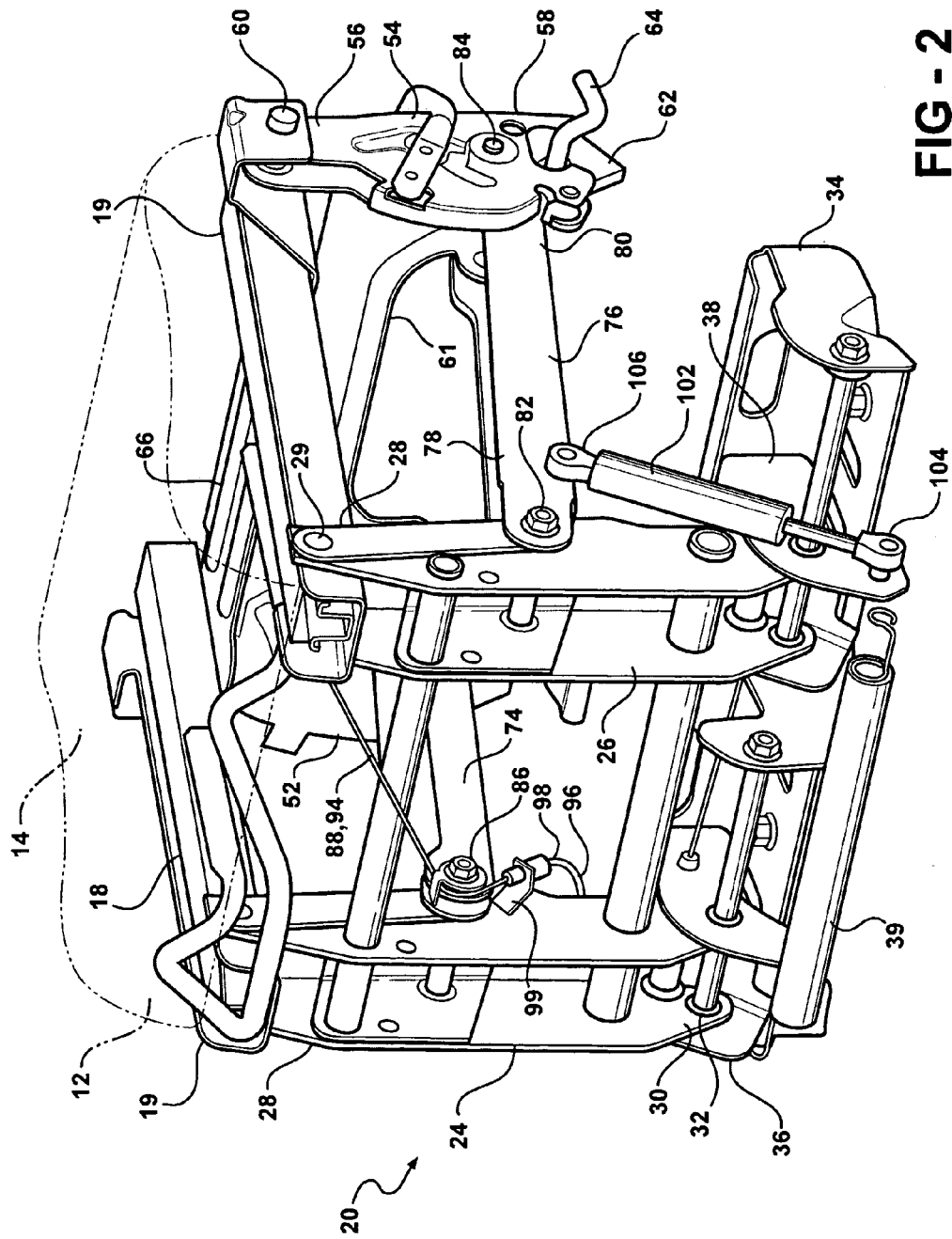
FIG. 2 is a front perspective view of the riser assembly in a seating position.
Figure 3:
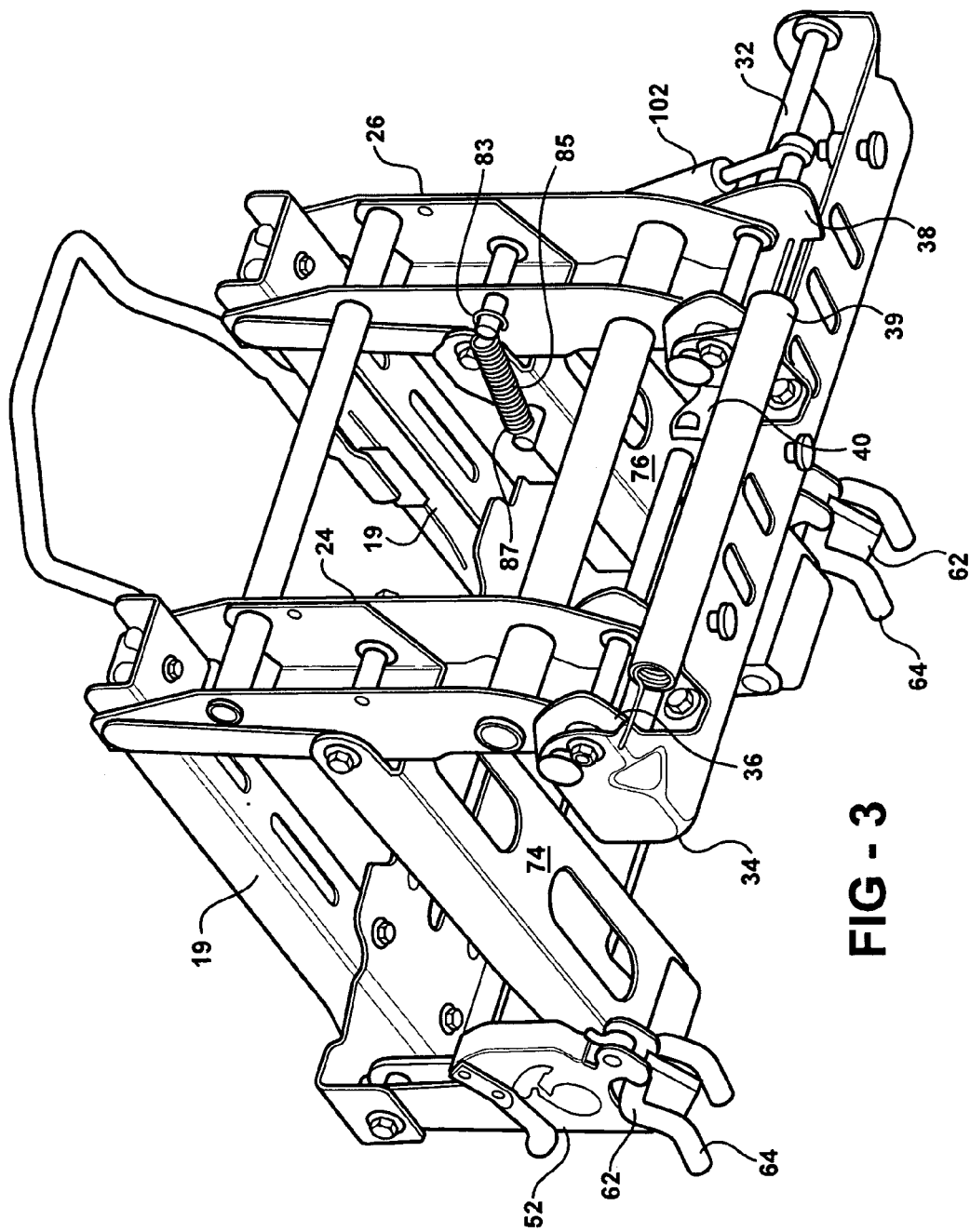
FIG. 3 is a bottom perspective view of the riser assembly in the seating position.

Referring to FIGS. 2 and 3, the riser assembly 20 includes first 52 and second 54 rear legs that are generally parallel to each other and spaced apart. Each of the first 52 and second 54 rear legs extends between an upper end 56 and a lower end 58. Each of the upper ends 56 of the first 52 and second 54 rear legs is pivotally coupled to a rear portion of the track mechanism 19 by a pivot pin 60 for movement between a support position for supporting the seat cushion 12 in the seating position and a folded position disposed along the track mechanism 19. Alternatively, the upper ends 56 of the first 52 and second 54 rear legs is pivotally coupled to the seat cushion 12, where the seat assembly 10 does not include the track mechanism 19. A first cross member 61 extends between the first 52 and second 54 rear legs for synchronizing the movement of the first 52 and second 54 rear legs between the support and folded positions. A floor latch 62, as known to those skilled in the art, is coupled to each of the lower ends 58 of the first 52 and second 54 rear legs. The floor latch 62 is latchingly engagable with a striker 64 fixedly secured to the floor 16 of the vehicle for locking the seat cushion 12 in the seating position. A second cross member 66 extends between the track mechanisms 19 to provide additional structural rigidity.

First 74 and second 76 links each extend between front 78 and rear 80 ends. Front pivot pins 82 pivotally interconnect the front ends 78 of the first 74 and second 76 links to the first 24 and second 26 front legs, respectively. Rear pivot pins 84 pivotally interconnect the rear ends 80 of the first 74 and second 76 links to the first 52 and second 54 rear legs, respectively. The first 74 and second 76 links move the first 52 and second 54 rear legs between the support and folded positions in response to pivotal movement of the seat cushion 12 between the seating and upright positions, respectively. It should be appreciated that only one of the first 74 and second 76 links is necessary for pivotally moving the first 52 and second 54 rear legs in response to pivotal movement of the seat cushion 12. Both of the first 74 and second 76 links are, however, preferred for increased stability and strength of the riser assembly 20.

A second biasing member 85 extends between a leg end 83 and a link end 87. The leg end 83 is fixedly secured to the second front leg 26 at point that is vertically below the front pivot pin 82. The link end 87 is fixedly secured to the second link 76 between the front 78 and rear 80 ends. While the seat cushion 12 is between the seating position and a predetermined over center position, the second biasing member 85 biases the second link 76 in a counterclockwise direction about the front pivot pin 82, as viewed in FIG. 3. The counterclockwise bias of the second link 76 biases the seat cushion 12 toward the seating position. When the seat cushion 12 is between the over center position and the upright position, the second biasing member 85 biases the second link 76 in a clockwise direction. The clockwise bias of the second link 76 biases the seat cushion 12 toward the upright position. At the over center position, the second biasing member 85 is linearly aligned with the front pivot pin 82, wherein the second link 76 is not pivotally biased by the second biasing member 85.

A pulley wheel 86 is rotatably coupled to one of the first 24 and second 26 front legs by the front pivot pin 82. The pulley wheel 86 is coupled to the first front leg 24 in the figures. A cable 88 extends between a first end 90 that is fixedly secured to the second cross member 66 and a second end 92 fixedly secured to the latch hook 44. The cable 88 includes an intermediate section 94 that extends between the first 90 and second 92 ends. A flexible sleeve 96 extends between an upper end 98 and a lower end 100. The upper end 98 is fixedly secured to a bracket 99 that is fixedly assembled to the first front leg 24, preferably adjacent the pulley wheel 86. The lower end 100 is fixedly secured to the first sliding bracket 36. A portion of the intermediate section 94 is slidably enclosed in the flexible sleeve 96. The portion of the intermediate portion 94 between the upper end 98 of the flexible sleeve 96 and the first end 90 is disposed around the pulley wheel 86. The cable 88 unlocks the latch mechanism 40 and laterally pulls the riser assembly 20 between the primary and secondary positions in response to pivotal movement of the seat cushion 12 between the seating and upright positions, respectively.

A gas strut 102 extends between a proximal end 104 pivotally coupled to the second sliding bracket 38 and an opposite distal end 106 pivotally coupled to the second link 76. The gas strut 102 dampens the movement of the seat cushion 12 between the seating and upright positions.

In operation, the first biasing spring 39 continuously biases the riser assembly 20 toward the primary position. While the riser assembly 20 is in the primary position, the seat cushion 12 is in the seating position. In the seating position, the floor latches 62 are lockingly engaged with the strikers 64 to maintain the first 52 and second 54 rear legs in the support position. The latch hook 44 is engaged with the locking edge 48 to prevent movement of the riser assembly 20 between the primary and secondary positions. To move the seat cushion 12 to the upright position, the floor latches 62 are disengaged from the strikers 64 by any suitable means, such as a cable and release lever or by a rigid towel bar operatively coupled between the floor latches 62. The seat cushion 12 can then pivot about the pivot pin 29 between the seating and upright positions. The movement of the seat cushion 12 from the seating position to the upright position causes the first end 90 of the cable 88 to be pulled outwardly relative to the pulley wheel 86. The outward pull of the first end 90 relative to the pulley wheel 86 shortens the length of the cable 88 that extends between the pulley wheel 86 and the second end 92 of the cable 88. The shortening of the cable 88 pulls the first 24 and second 26 front legs toward the secondary position against the force applied by the first biasing member 39.

Figure 7:
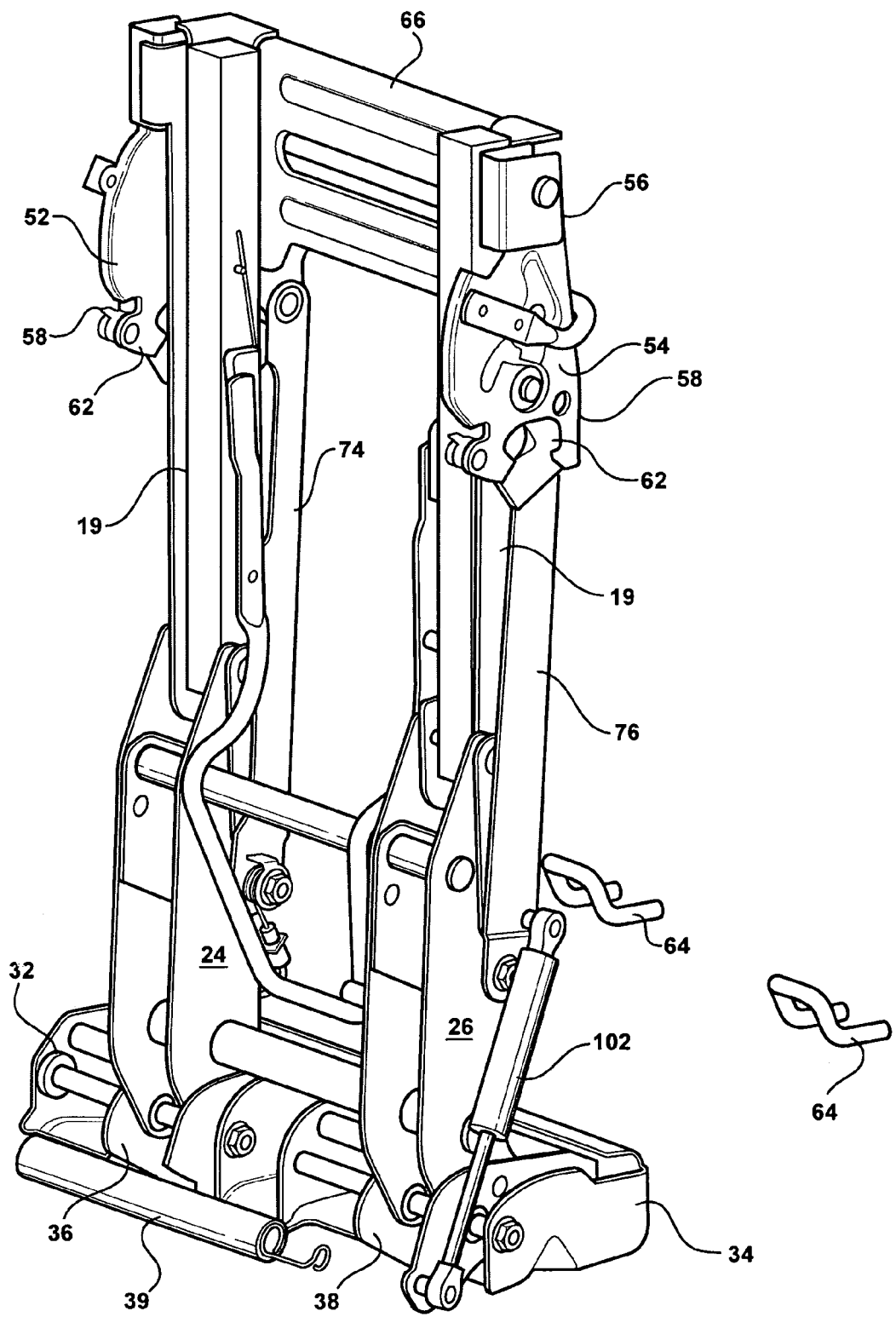
FIG. 7 is a front perspective view of the riser assembly in an upright position.
Figure 8:
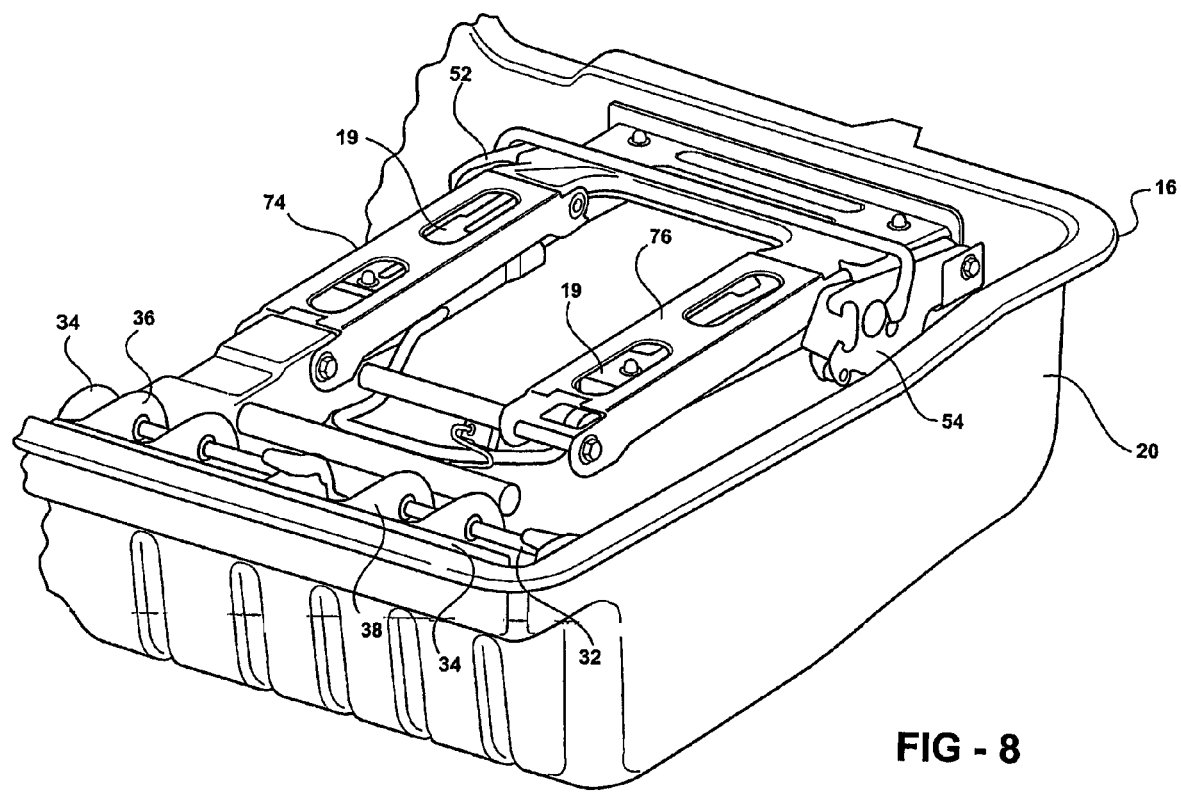
FIG. 8 is a front perspective view of the riser assembly in a forwardly stowed position disposed within a recess in a floor of a vehicle.

The movement of the seat cushion 12 from the seating position to the upright position also causes the first 74 and second 76 links to pivot counterclockwise about the front pivot pin 82, as viewed in FIGS. 1, 2 and 7. The counterclockwise movement of the first 74 and second 76 links pulls the first 52 and second 54 rear legs, respectively, from the support position to the folded position. The counterclockwise movement of the second link 76 extends the gas strut 102 by outwardly displacing the distal end 106 relative to the proximal end 104. Movement of the seat cushion 12 from the seating position to the upright position is resisted by the second biasing member 85 until the over center position, after which the second biasing member 85 assists movement of the seat cushion 12 toward the upright position.

In the upright position, the seat cushion 12 extends generally vertically from the top of the first 24 and second 26 front legs, such that the seat cushion 12 is aligned longitudinally therewith, as shown in FIG. 7. The seat cushion 12 remains longitudinally aligned with the first 24 and second 26 front legs during pivotal movement about the rod 32 between the seating and the forwardly stowed position. While in the secondary position, the seat cushion 12 is selectively movable between the upright and forwardly stowed positions. The first 24 and second 26 front legs do not move laterally and remain in the secondary position during movement of the seat cushion 12 between the seating and forwardly stowed positions. Movement of the seat cushion 12 between the upright and forwardly stowed positions is dampened by the expansion and contraction of the strut 102, respectively.

The seat cushion 12 can be returned to the seating position by pivoting the first 24 and second 26 legs about the rod 32 to the upright position. From the upright position, the seat cushion 12 can be moved about the pivot pin 29 to the seating position. The movement of the seat cushion 12 from the upright position to the seating position displaces the first end 90 of the cable 88 toward the pulley wheel 86, which adds to the length of cable 88 between the lower end 100 of the flexible sleeve 96 and the second end 92 of the cable 88. The lengthening of the cable 88 between the pulley wheel 86 and the second end 92 of the cable 88 allows the first 24 and second 26 front legs to slide laterally along the rod 32 from the secondary position to the primary position due to the continuous bias of the first biasing member 39. The latch hook 44 engages the latch edge 48 to lock the seat assembly 10 in the primary position.

As the seat cushion 12 pivots about the pivot pins 29 from the upright position to the seating position, the first 75 and second 76 links push the first 52 and second 54 rear legs, respectively, from the folded position to the support position. In the support position, the first 52 and second 54 rear legs engage the strikers 64 to lock the seat cushion 12 in the seating position.

Figure 9:
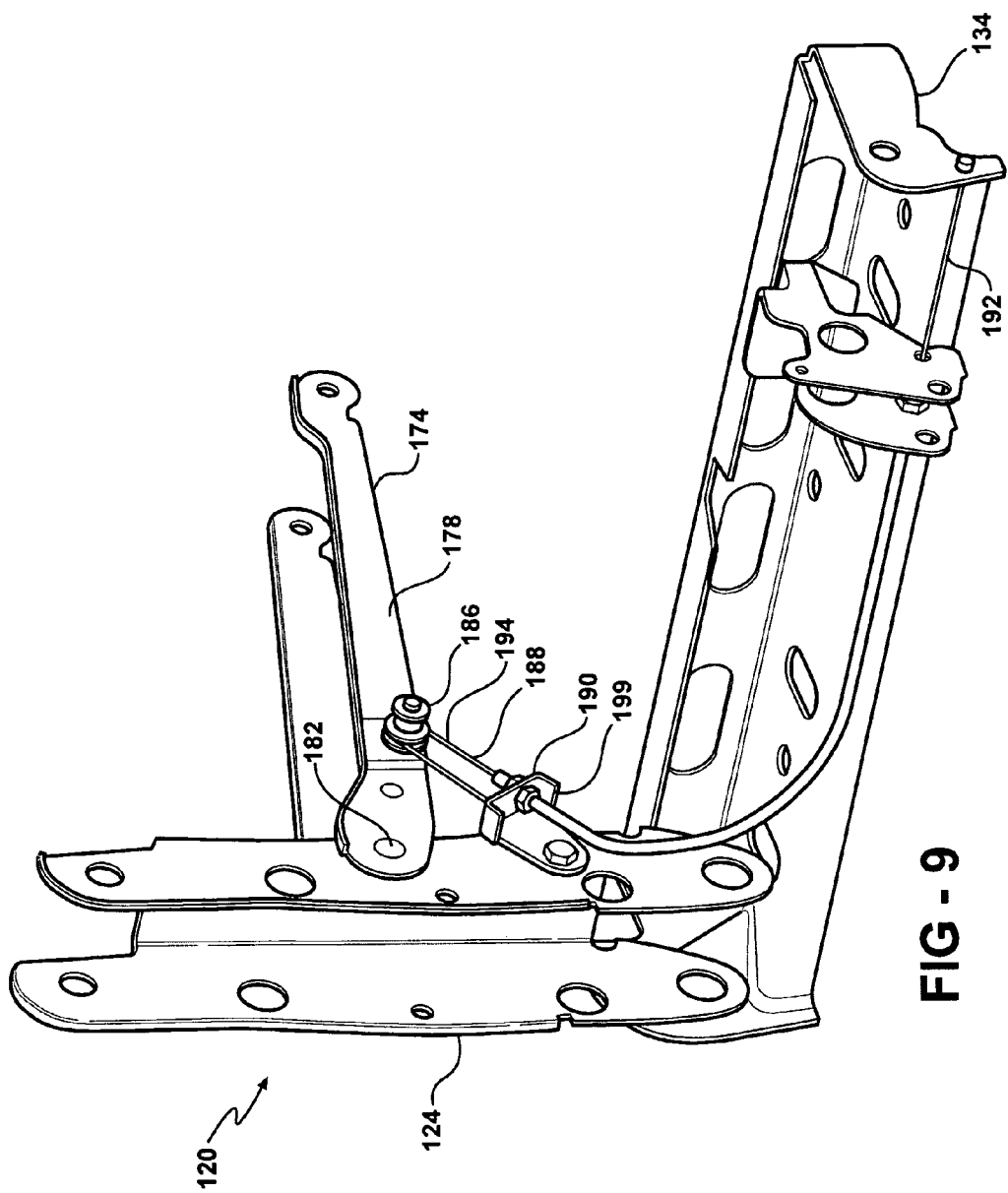
FIG. 9 is a partial front perspective view of a riser assembly according to a second embodiment of the invention.

Referring to FIG. 9, a second embodiment of the riser assembly is generally indicated at 120, wherein elements of the alternative embodiment similar to those in the first embodiment are indicated by reference characters that are offset by 100. The pulley wheel 186 is rotatably assembled to the front end 178 of the first link 174. The intermediate portion 194 of the cable 188 is wrapped around the pulley wheel 186. The first end 190 of the cable 188 is fixedly secured to a cable bracket 199. The second end 192 of the cable 188 is fixedly secured to the floor bracket 134. The length of the cable 188 between the pulley wheel 186 and the second end 192 is lengthened and shortened in response to movement of the seat cushion 12 between the seating and upright positions resulting in pivotal movement of the first link 174 about the front pivot pin 182, as shown in FIGS. 10 and 11. The pivotal movement of the first link 174 causes movement of the cable 188 about the pulley wheel 186. The lengthening and shortening of the cable 188 between the pulley wheel 186 and the second end 192 causes movement of the first 124 and second (not shown) front legs between primary and secondary positions.

Figure 12:
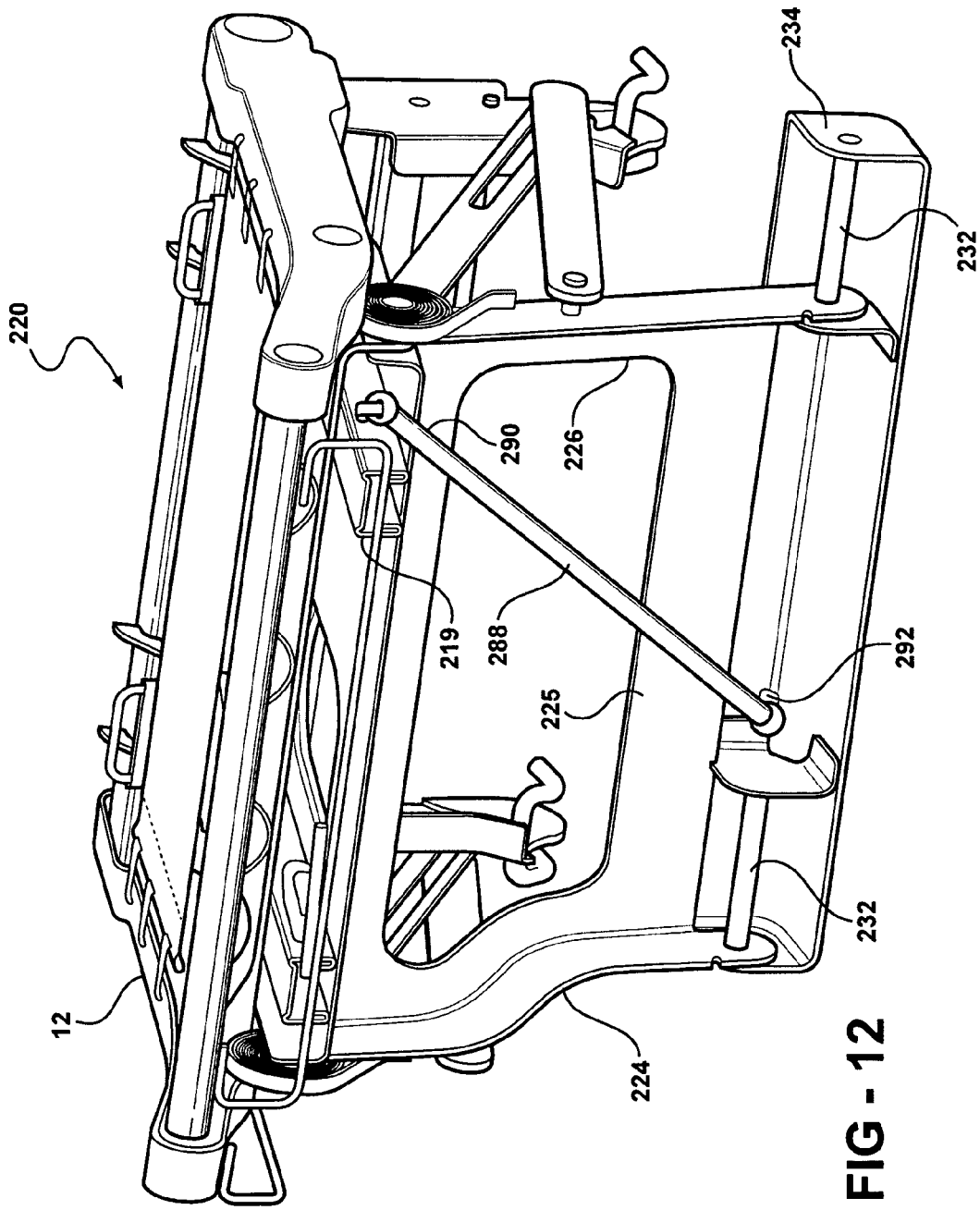
FIG. 12 is a front perspective view of a riser assembly according to a third embodiment of the invention.

Referring to FIG. 12, a third embodiment of the riser assembly is generally indicated at 220. The first 224 and second 226 front legs are interconnected by a front cross member 225 that extends laterally therebetween. The first 224 and second 226 front legs are slidably and pivotally coupled to the rod 232. The rod 232 is fixedly secured to the floor by the floor bracket 234. Instead of the cable 88 of the first and second embodiments, a rigid rod 288 is used to pull the seat cushion 12 between the primary and secondary positions in response to pivotal movement of the seat cushion 12 between the seating and upright positions, respectively. More specifically, the rod 288 extends between first 290 and second 292 ends. The first end 290 is rotatably coupled to the track mechanism 219 in a ball joint type arrangement. Similarly, the second end 292 is rotatably coupled to the floor bracket 234 by a ball joint type arrangement. The effective length of the rigid rod 288 shortens as the seat cushion 12 rotates about the front legs 224, 226; thereby resulting in the lateral displacement of the seat cushion 12. As the seat cushion 12 is moved to the upright position from the seating position, the effective length of the rigid rod 288 decreases forcing the seat cushion 12 laterally toward the secondary position. Conversely, as the seat cushion 12 is returned to the seating position from the upright position the effective length of the rigid rod 288 is increased resulting in lateral displacement of the seat cushion 12 toward the primary position.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practiced other than as specifically described.

What is claimed is:

1. A riser assembly extending between a seat cushion and a floor of an automotive vehicle, the riser assembly comprising:

a floor bracket fixedly secured to the floor of the vehicle;

a rod fixedly secured to the floor bracket;

front legs extending between an upper end pivotally coupled to the seat cushion for movement of the seat cushion relative to the front leg between a seating position and an upright position and a lower end slidably coupled to the rod for lateral movement of the seat cushion between primary and secondary positions;

a pulley wheel pivotally coupled to the front leg between the upper and lower ends thereof; and a cable having an intermediate portion extending between a first end fixedly secured to the seat cushion and a second end associated with the floor bracket, wherein the intermediate portion is wrapped around the pulley wheel for effecting automatic lateral movement of the seat cushion between the primary and secondary positions in response to pivotal movement of the seat cushion between the seating and upright positions, respectively.

2. A riser assembly as set forth in claim 1 further including a track mechanism coupled to the seat cushion and wherein the upper ends of the legs are pivotally couopled to the track mechanism.

3. A riser assembly as set forth in claim 1 further including sliding brackets defined by a base wall extending between upright retaining walls, wherein the front legs are laterally retained between the retaining walls for movement between the primary and secondary positions.

4. A riser assembly as set forth in claim 3 wherein the cable includes a flexible sleeve having an upper end attached to a bracket associated with the front leg and a lower end attached to the sliding bracket.

5. A riser assembly as set forth in claim 3 including a gas strut having a proximal end pivotally connected to the sliding bracket and an opposing distal end pivotally coupled to at least one link member for aiding movement of the seat cushion.

6. A riser assembly as set forth in claim 1 including a first biasing member associated with the riser assembly for biasing the riser assembly toward the primary position.

7. A riser assembly as set forth in claim 1 including a latch mechanism having a latch bracket fixedly secured to the floor bracket.

8. A riser assembly as set forth in claim 7 including a latch hook pivotally coupled to the latch bracket.

9. A riser assembly as set forth in claim 8 wherein the sliding bracket includes a latch edge defining an aperture wherein the latch hook projects through the aperture for selective engagement with the latch edge.

10. A riser assembly as set forth in claim 8 including a latch biasing member for biasing the latch hook towards engagement with the latch edge.

11. A riser assembly as set forth in claim 1 including rear legs extending between an upper end pivotally coupled to the seat cushion and a lower end associated with a floor latch.

12. A riser assembly as set forth in claim 11 including a first cross member extending between the rear legs for synchronizing movement of the rear legs between support and folded positions.

13. A riser assembly as set forth in claim 11 including at least one link member pivotally coupled to the front and rear legs for moving the front and rear legs between support and folded positions.

14. A riser assembly as set forth in claim 13 including a second biasing member having a leg end connected to the front leg and a link end connected to the link member for selectively biasing the link member in response to a position of the seat cushion.

15. A riser assembly extending between a seat cushion and a floor of an automotive vehicle, the riser assembly comprising:
   a floor bracket fixedly secured to the floor of the vehicle;
   a rod fixedly secured to the floor bracket;
   front legs extending between an upper end pivotally coupled to the seat cushion for movement of the seat cushion relative to the front leg between a seating position and an upright position and a lower end slidably coupled to the rod for lateral movement of the seat cushion between primary and secondary positions;
   rear legs extending between an upper end pivotally coupled to the seat cushion and a lower end associated with a floor latch; at least one link member pivotally coupled to the front and rear legs for moving the front and rear legs between support and folded positions;
   a pulley wheel pivotally coupled to the at least one link; and
   a cable having an intermediate portion extending between a first end fixedly secured to a cable bracket attached to the front leg and a second end fixedly secured to the floor bracket, wherein the intermediate portion is wrapped around the pulley wheel for effecting automatic lateral movement of the seat cushion between the primary and secondary positions in response to pivotal movement of the seat cushion between the seating and upright positions, respectively.

16. A riser assembly as set forth in claim 15 wherein the cable bracket is pivotally attached to the front leg for maintaining a position of the cable bracket relative to the pulley wheel.

17. A riser assembly extending between a seat cushion and a floor of an automotive vehicle, the riser assembly comprising:
   a floor bracket fixedly secured to the floor of the vehicle;
   a rod fixedly secured to the floor bracket;
   front legs extending between an upper end pivotally coupled to the seat cushion for movement of the seat cushion relative to the front leg between a seating position and an upright position and a lower end slidably coupled to the rod for lateral movement of the seat cushion between primary and secondary positions; and
   a rigid rod having a first end rotatably attached to a track mechanism which is attached the seat cushion and a second end rotatably coupled to the floor bracket for effecting automatic lateral movement of the seat cushion between the primary and secondary positions in response to pivotal movement of the seat cushion between the seating and upright positions, respectively.

18. A riser assembly as set forth in claim 17 wherein the first and second ends of the rigid rod are attached to the track mechanism and floor bracket, respectively by a ball joint linkage.

19. A riser assembly as set forth in claim 17 including a front cross member interconnecting the front legs.

* * * * *